US008847951B1

(12) United States Patent
Anguelov et al.

(10) Patent No.: US 8,847,951 B1
(45) Date of Patent: *Sep. 30, 2014

(54) AUTOMATIC VIDEO AND DENSE IMAGE-BASED GEOGRAPHIC INFORMATION MATCHING AND BROWSING

(71) Applicant: Google Inc., Mountain View, CA (US)

(72) Inventors: Dragomir Anguelov, San Francisco, CA (US); Abhijit S. Ogale, Mountain View, CA (US); Ehud Rivlin, Haifa, IL (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,242

(22) Filed: Oct. 16, 2013

Related U.S. Application Data (63) Continuation of application No. 12/431,279, filed on Apr. 28, 2009, now Pat. No. 8,593,485.

(51) Int. Cl.
*G06T 15/00* (2011.01)
*G09G 5/377* (2006.01)

(52) U.S. Cl.
CPC .................................... *G09G 5/377* (2013.01)
USPC ........................................ 345/419; 345/619

(58) Field of Classification Search
CPC ... G06F 17/30241; G06K 9/56; G06K 9/6276
USPC ................................................ 345/419, 619
See application file for complete search history.

(56) References Cited

U.S. PATENT DOCUMENTS 6,453,056 B2  9/2002  Laumeyer et al.
6,956,573 B1  10/2005  Bergen et al.
(Continued)

FOREIGN PATENT DOCUMENTS

EP  2315075 A1  4/2011
WO  2013181032 A2  12/2013

OTHER PUBLICATIONS

Aude Oliva and Antonio Torralba, Building the Gist of a Scene: The Role of Global Image Features in Recognition; Progress in Brain Research, vol. 155, 2006 (16 pages).

Hartmut Neven, Geordie Rose and William G. Macready, Image Recognition With an Adiabatic Quantum Computer: I. Mapping to Quadratic Unconstrained Binary Optimization; Apr. 28, 2008, pp. 1-7.

(Continued)

*Primary Examiner* — Kee M Tung
*Assistant Examiner* — Peter Hoang
(74) *Attorney, Agent, or Firm* — Lerner, David, Littenberg, Krumholz & Mentlik, LLP (57) ABSTRACT

Methods and systems permit automatic matching of videos with images from dense image-based geographic information systems. In some embodiments, video data including image frames is accessed. The video data may be segmented to determine a first image frame of a segment of the video data. Data representing information from the first image frame may be automatically compared with data representing information from a plurality of image frames of an image-based geographic information data system. Such a comparison may, for example, involve a search for a best match between geometric features, histograms, color data, texture data, etc. of the compared images. Based on the automatic comparing, an association between the video and one or more images of the image-based geographic information data system may be generated. The association may represent a geographic correlation between selected images of the system and the video data.

14 Claims, 6 Drawing Sheets

(56) References Cited

U.S. PATENT DOCUMENTS

| | | |
|---|---|---|
| 7,127,068 B2 | 10/2006 | Sundaravel et al. |
| 7,359,797 B2 | 4/2008 | Dorfman et al. |
| 8,385,591 B1 | 2/2013 | Anguelov et al. |
| 8,447,136 B2 | 5/2013 | Ofek et al. |
| 8,593,485 B1 | 11/2013 | Anguelov et al. |
| 8,605,133 B2 | 12/2013 | Lampotang et al. |
| 2003/0191694 A1 | 10/2003 | Vonfeldt et al. |
| 2005/0162523 A1 | 7/2005 | Darrell et al. |
| 2007/0173956 A1 | 7/2007 | Koch et al. |
| 2007/0255725 A1 | 11/2007 | McCoach |
| 2008/0002916 A1 | 1/2008 | Vincent et al. |
| 2013/0155181 A1 | 6/2013 | Williams et al. |

OTHER PUBLICATIONS http://www.gigapan.org/index.php, printed May 4, 2009.

http://www.ogleearth.com12007/10/earthmine_or_th.html, printed May 4, 2009.

ICCV 2005 Computer Vision Contest, http:/research.microsft.com/en-us/um/people/szelisk/VisionContest . . . , printed May 21, 2012.

Masakatsu Kourogi, Takeshi Kurata, Katsuhiko Sakaue, A Panorama-based Method of Personal Positioning and Orientation and Its Real-time Applications for Wearable Computers, ISWC2001 in Zurich, Switerland, pp. 107-114, 2001.

Masakatsu Kourogi, Takeshi Kurata, Katsuhiko Sakaue, Yoichi Muraoka, Improvement of panorama-based annotation overlay using omnidirectional vision and inertial sensors, 2000, pp. 183-184, IEEE.

| GIS Image ID | Video ID | Search Frame ID | Segment ID | Transition Data |
|---|---|---|---|---|
| Image 1 | Video 54 | Frame 2010 | Segment 3 | Crop (x,y,x,y) |
| Image 9 | Video 210 | Frame 38 | Segment 1 | Stretch |
| Image 35 | | | | |
| Image 202 | Video 3 | Frame 70019 | Segment 9 | Rotate |
| Image 203 | Video 809 | Frame 240 | Segment 6 | Shift |
| Image 5999 | Video 3 | Frame 100 | Segment 1 | Crop, shift |
| ... | | | | |

AUTOMATIC VIDEO AND DENSE IMAGE-BASED GEOGRAPHIC INFORMATION MATCHING AND BROWSING

CROSS-REFERENCE TO RELATED APPLICATIONS

The present application is a continuation of U.S. patent application Ser. No. 12/431,279, filed Apr. 28, 2009, the disclosure of which is incorporated herein by reference.

BACKGROUND OF THE INVENTION

A geographic information system (GIS) maintains data in a manner that is linked to geographical location information. Typically, such a system can provide an interface for a display of the included geographic information. For example, consider the Google Street View feature of Google Maps and Google Earth, both accessible via the www.google.com uniform resource locater (URL). Google Street View can display photo images that present panoramic street level views based on their association with particular geographic locations. The photo images of street level views may be accessed and displayed on a client computer from the Internet by searching particular addresses or geographic locations in a user interface of a web browser on the Google Maps or Google Earth website and by selecting a particular area within a map that is displayed in response to a search request. In this regard, the GIS can associate positioning information, such as street addresses with images of the GIS.

BRIEF DESCRIPTION OF THE DRAWINGS

The present technology is illustrated by way of example, and not by way of limitation, in the figures of the accompanying drawings, in which like reference numerals refer to similar elements including.

BRIEF SUMMARY OF THE INVENTION

One aspect of the present technology involves methods for processing image data of a GIS to generate associations with videos based on visual geographic features common to the image data and video data. An example embodiment involves a method for automated processing of image data. The method may include accessing video data that includes a plurality of image frames. The method may segment the video data to determine a first image frame of a segment of the video data. In the method, a digital processor may automatically compare data representing information from the first image frame with data representing information from a plurality of images of an image-based geographic information data structure. Based on the comparing, an association can be generated between the video data and a second image from the image based geographic information. In this way, the second image can have a geographic correlation with the video data.

In some embodiments of the method, the automatic comparing may involve a comparison of one or more of histogram data, color distribution data, texture distribution data, and geometric feature data determined from the first image frame and determined from an image of the plurality of images. In addition, the generated association may include a link between the second image and the segment of the video data, the link being accessible with a user interface of the image-based geographic information data structure. The method may further involve accessing of the link to initiate displaying of a frame or search frame of the video data.

In some embodiments of the method, the accessing of the link initiates displaying of the segment of the video data or the video. In still further embodiments, the method may further involve altering a display characteristic of a display image or second image of the image-based geographic information data structure to correspond a presentation of the display image with a presentation of the displayed frame of the video data. In some embodiments, the altering of the display characteristic may be one or more of stretching, cropping, zooming, rotating, and shrinking at least a portion of the display image or second image. In some embodiments, the association may be a link between the second image and the segment of the video data where the link can be accessed with a user interface of a video player application to display the segment of the video.

In some embodiments, the plurality of image frames of the image-based geographic information data structure that are compared in the automatically comparing process may comprise a reduced candidate image set of the image-based geographic information data structure. In such a case, the reduced candidate image set can be formed or selected by comparing first positioning information associated with the video data with second positioning information associated with a plurality of images of an image-based geographic information data structure.

These and other features of the method may be embodied in whole or in part in a machine readable medium as processor control instructions to control a processor of a processing device or computer as discussed in more detail herein.

Further embodiments and features of the technology will be apparent from the following detailed disclosure, abstract, drawings and the claims.

DETAILED DESCRIPTION

In one aspect, the present technology involves methods for processing image data of a GIS to automate generating of associations between the image data and videos based on visual geographic features that may be common to the image data and the video data. Thus, the technology will involve a computer implemented method for automated processing of image data. Video data may be accessed where the video data includes a plurality of image frames. The video data may be segmented to determine a first image frame of a segment of the video data. A digital processor may automatically compare data representing information from the first image frame with data representing information from a plurality of images of an image-based geographic information data structure. Based on the comparing, an association can be generated between the video data and a second image from the image based geographic information. In this way, the second image can have a geographic correlation with the video data and the video may be displayed or launched based its association with an image from the GIS.

Figure 1:
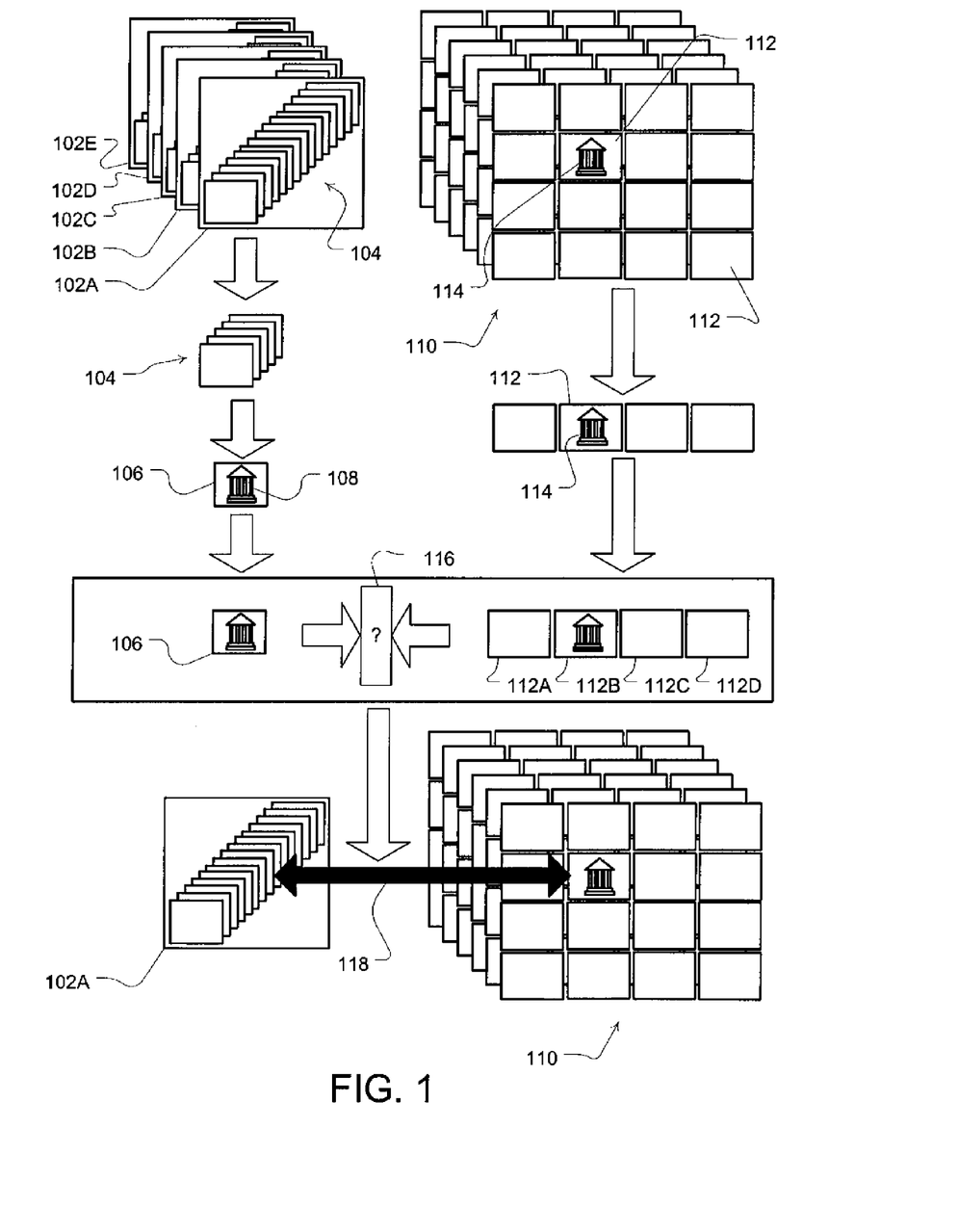
FIG. 1 is a conceptual illustration of an embodiment for associating video data with image-based geographic information systems of the present technology.

An example implementation of the present technology for generating associations between videos and images of a GIS for display with the GIS is illustrated in FIG. 1. Videos 102A, 102B, 102C, 102D, 102E each have a plurality of different image frames 104 to form the video. Typically, the image frames of the videos may contain geographic visual information 108 that depicts geographic locations. For example, the videos may include a home owner's or realtor's video of a property being offered for sale or a video made of geographic locations or attractions by a tourist at one or more vacation destinations. These videos may be stored as digital video files in any suitable format such as an MPEG file or similar, for example. The present technology links the geographical visual information of these video files with geographic visual information of an image-based geographic information system (GIS) 110.

In this regard, the GIS will typically include different images 112 such as digital photographs in any suitable image data file format (e.g., Bitmap, JPEG, etc.). These images may be linked to the positioning information of the GIS in a database or similar data storage structure. For example, filenames of images of a database may be linked or associated with street addresses, global positioning satellite coordinates, or any other data for specifying geographic location. Like the videos, each image 112, 112A, 112B, 112C, 112D may include geographic visual information 114 that depicts geographic locations.

In embodiments of the present technology, links between images of the GIS and the videos are generated with an automated comparison of data from these items. Such a comparison process will typically be based on a search frame from a video. For example, a video file 102A for which a geographic association with images of the GIS is desired, may be divided into a segment 105 of image frames in an optional segmenting process. The segmenting process can select a group of successive frames with a beginning frame and ending frame that form a discrete shot within the video. For example, a beginning and end for each segment may be determined by analysis of pixel information from successive frames of the video for significant changes in visual information to determine whether two shots or sequences of frames are spatially and/or temporally well separated. Such a segmenting process may be performed by conventional shot boundary or transition detection methods. For example, such a process may detect significant color or lighting changes (e.g., fade in or fade out), abrupt motion changes (e.g., movement of the camera) etc. For example, a time series of discontinuity feature values (e.g., edge change ratios) may be calculated to measure dissimilarity between successive frames. Such changes may also be detected from changes in histogram data (e.g., color histograms) from successive frames that exceed suitable thresholds (e.g., a histogram distance function).

Then, from the frames of a segment or each segment from the video, a search image frame 106 may be selected. The search image frame may be selected to be a representative frame of the remaining frames of the segment. For example, a middle frame, beginning frame or ending frame may serve as a search frame for the association generation process. In some embodiments, the search frame of a segment may be selected based on its distance (e.g., sequential frame count) if it exceeds a threshold (e.g., number of frames) from a selected search frame from a preceding segment. In other embodiments, the search frame of a segment may simply be selected randomly from the segment.

Alternatively, one or more search frames may be selected without a segmenting process from each video file either randomly or each frame of the video may successively serve as a search frame.

The comparison process with data from a search frame 106 will also utilize data from candidate images 112A, 112B, 112C, 112D selected from the images of the GIS 110. While this comparison process for each search image 106 may involve data from each image of the GIS 110, given processing limitations and the potential large number of images in highly dense image-based GIS, the potential group of candidate images for the comparison process of each search image frame may be implemented in a more focused process to improve efficiency. For example, the comparison process for each search frame may be limited or reduced to some subset of all of the images of the GIS 110. For example, a subset of images may be determined based on a concurrency or overlap between positioning information associated with particular images of the GIS and positioning information that may be associated with the video of a given search frame. For example, if the video is associated or tagged with any one or more of a particular street address, town, state, GPS coordinates, longitude and latitude, etc., this data may be compared for a geographic proximity concurrence or equality with similar data of the GIS. With this analysis, a reduced subset of images from the GIS may be selected for comparison as a function of positioning information.

Thereafter, an automatic comparison process 116 may implement a comparison between data from the search frame 106 and data from each of the images from a group of candidate images 112A, 112B, 112C, 112D of the GIS, which may be the reduced subset, to find a suitable match. The goal of the comparison process is to find a correlation between the visual features of the search frame with the visual features of at least one candidate frame such that a visual geographic feature of the video corresponds to a visual geographic feature of a selected candidate image. For example, the process may result in locating a candidate image of the GIS with a building or a particular view of the building that is also located in the search image from the video. The compared data of this process will typically be based on the pixel information of both the search image and a candidate image. One suitable comparison process may involve the matching process disclosed in U.S. patent application Ser. No. 12/431,045 filed on Apr. 28, 2009, and issued as U.S. Pat. No. 8,385,591, the entire disclosure of which is incorporated herein by cross-reference. By way of further example, a scale-invariant feature transform (SIFT) analysis between the search image frame and each candidate image may be performed. A best match may be determined based on the score of each image pair analysis. A best match score may be further or alternatively based on a correlation between other image information for the search image frame and each candidate frame such as differences or similarities in color histogram data, texture data, and/or geometric features determined by edge detection or other conventional image analysis methods.

Upon determination of a suitable match between the search frame and a candidate image, an association 118 may be generated for the GIS to store the relationship determined by the comparison process. As discussed in more detail herein with regard to FIG. 3, the association provides a data link between the candidate image and any one or more of the video, search frame and/or the determined video segment from which the search frame belongs.

Figure 2:
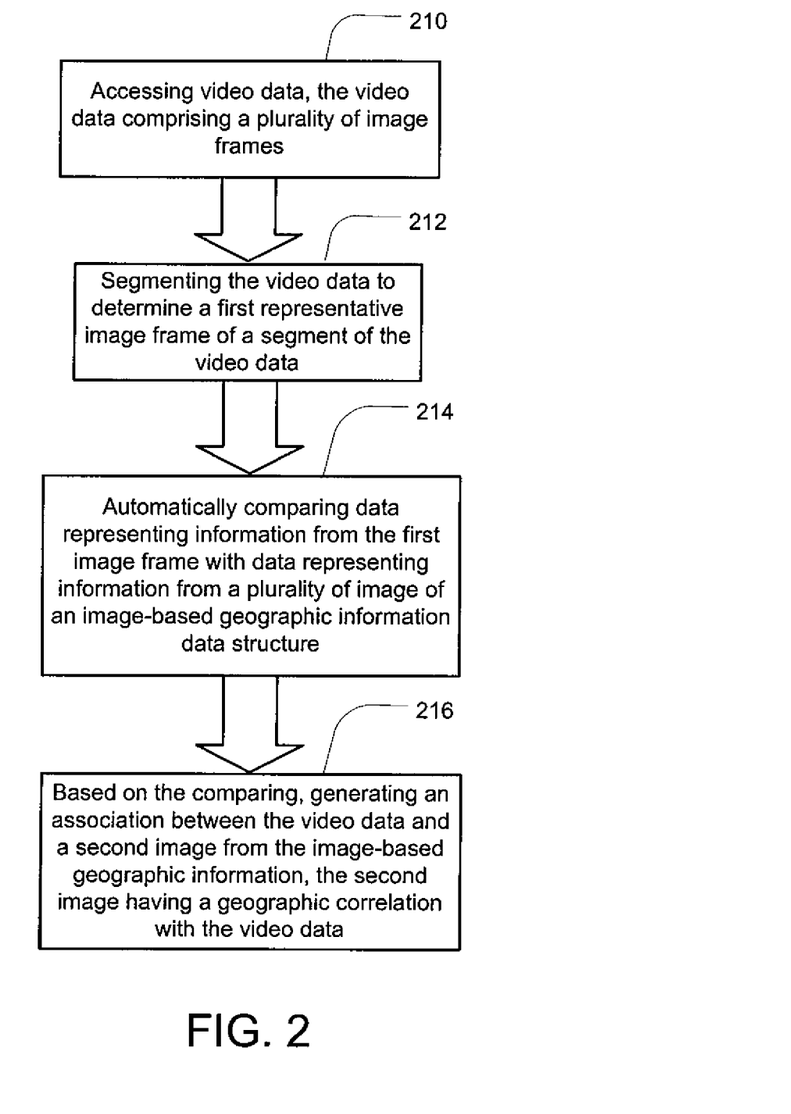
FIG. 2 is a flow chart for an example algorithm for generating associations between video data and image-based geographic information systems.

FIG. 2 is a flow chart showing steps for an example embodiment of this methodology for generating associations between videos and images of a GIS of the technology. In 210, video data having multiple video frames is accessed. Optionally in 212, the video data is segmented to determine a first image or search image of at least one segment of the video data. In 214, data representing information from the first image or search image is automatically compared, such as by a computer and/or signal processor, with corresponding data representing information from images from an image-based GIS. In 216, based on this comparing, an association or link is generated between the video data and a second image from the image-based GIS where the second image has a geographic correlation with the video data.

Figure 3:
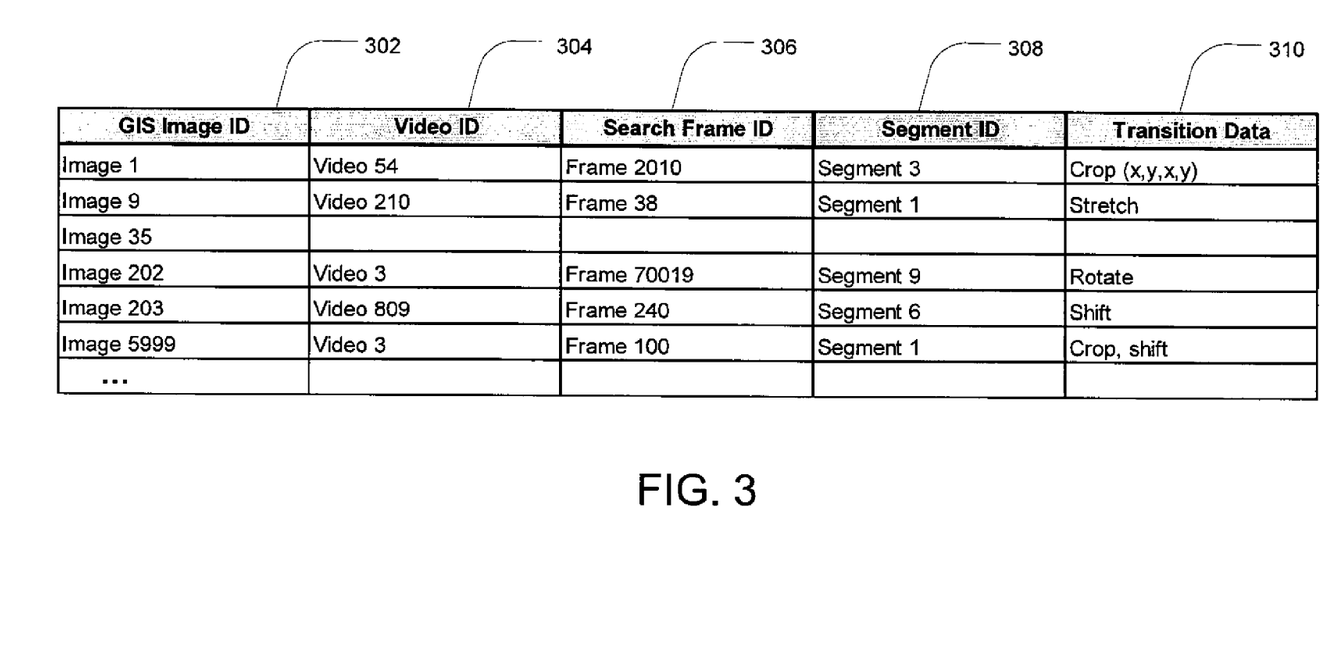
FIG. 3 is an illustration of an example table of associations that may be utilized in some embodiments for linking videos with images of image-based geographic information systems.

In a case where a GIS utilizes a database of images, a table may be created to maintain a data relationship or association between the video and the matched image of the GIS. For example, embodiments of the technology may generate a table entry to a database or other data structure to store or record the relationship. FIG. 3 illustrates a table with examples of generated associations suitable for associating the video data with images of the GIS. In this example, a table, such as a database table, may include GIS Image IDs 302 with identifiers of best match candidate images from a comparison process. The GIS Image IDs are identifiers that may be, for example, file names, URLs or some other data link to the candidate image. The table may even hold the data of the image itself. With such a table, the best match candidate images are linked to video IDs 304, search frame IDs 306, segment IDs 308 and/or display transition data 310. The video IDs 304 are identifiers that may be, for example, file names, URLs or some other data link to the video data. The table may even include the video data itself. Thus, with an identified image that can be located through a search interface of the image-based GIS, a video may also be accessed by its association with the image of the GIS.

Moreover, in embodiments of the GIS that maintain either a search frame ID 306 (e.g., a frame number) or segment ID 308 (e.g., a frame number of the first frame of a segment or a range of frames of the segment), a more efficient link to the geographic features of interest in the associated video may be implemented. For example, by associating a search frame identifier with the image of the GIS, a linked presentation of the video (i.e., playing the video file) does not need to begin playing from the beginning of the video but may start at the search frame that has the determined visual geographic relation with the image of the GIS. In such as case, playing of the video via an interface of the GIS may be initiated at the search frame. Optionally, with the segment identifier, playing of the video via an interface of the GIS may be initiated at the beginning of the video segment of which the search image frame is included. In this way, a user of a search interface of the GIS need not view the entire video, but may simply see a portion of the video containing the determined geographic features that have been associated to the images of the GIS in the automated comparison process.

In some embodiments, display transition data 310 may optionally be stored to provide information for improving a display transition between a presentation of an image of the GIS and a presentation of the associated video, segment or search frame. For example, display transition data may comprise instructions for modifying a presentation of an image of the GIS and/or a frame from the video to give them a more unified presentation appearance for transition between them. For example, such data may be image processing instructions such as data for stretching, cropping, rotating, shifting, color adjustment, etc. of certain pixel data of either of the images to unify the appearance of the common geographic feature in the frame and image. Optionally, this transition data may include images that are the result of such image modification instructions. Thus, when a user interface of the GIS launches a presentation of the video from an image of the GIS, such as by a user clicking on an icon or URL presented with the GIS, the transition instruction data may be utilized to more seamlessly present the visual geographic feature of the GIS image to that feature in the associated frames of the video.

Although not shown, data of the GIS like that of the example table of FIG. 3 can also typically include positioning information (e.g. geographic location data) for the geographic features of each GIS image of the table to associate positioning information with the images of the GIS. Thus, this association can also relate the positioning information to the remaining information of the table.

Figure 4:
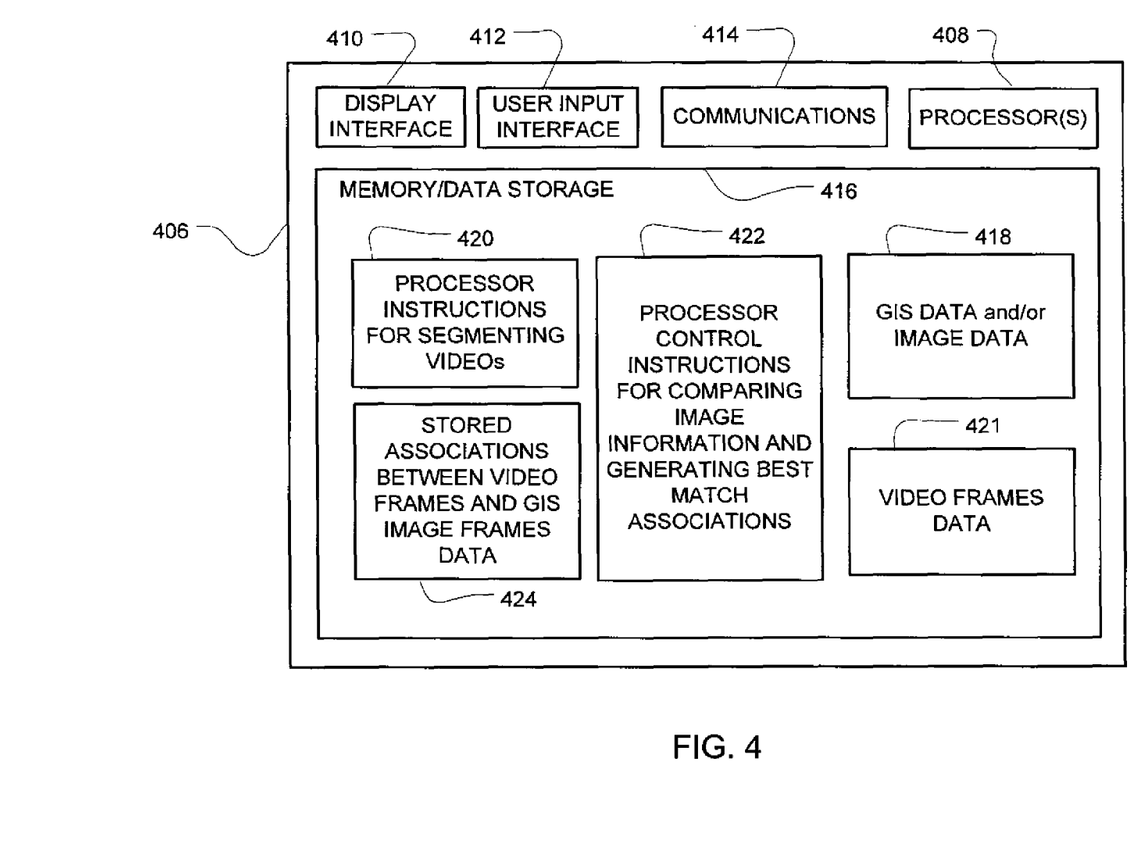
FIG. 4 is an example system diagram with suitable components for implementing a generation of associations between videos and images of image-based geographic information systems in an embodiment of the present technology.

These automated methodologies may be implemented as hardware and/or software in computerized systems. For example, FIG. 4 shows suitable components of a processing apparatus or computer 406 that may generate and display associations in accordance with the previously described embodiments. Thus, a suitable computer may be a general or specific purpose computer with programmable processing control instructions. In the example, computer 406 will typically include one or more processor(s) 408 such as a programmable microprocessor, CPU, DSPs, ASICs etc. to execute the algorithms previously discussed. The computer 406 may also include a display interface 410 for transferring video or image output signals to a display such as an LCD, CRT, plasma, etc. with a viewing screen to show the images or videos and data of an image-based GIS. The computer 406 may also include a user input interface 412 to permit a user to control the apparatus such as with a keyboard and/or mouse etc. Similarly, the computer may also optionally include other input and output components such as a memory card or memory device interface, magnetic and/or optical drives, communication devices 414 (e.g., a modem, wired or wireless networking device, etc.). These components may permit input and output of videos, images and GIS data and other data related to the automatic processes as previously discussed. They may also optionally permit the computer to act as a server to permit client computers to access the applications and data that constitute a user interface of a GIS of the present technology.

As illustrated in the embodiment of FIG. 4, the computer 406 can typically include data and processor control instructions in a memory 416 or data storage that control execution of the functions, methods, algorithms and/or routines as described herein. In some embodiments, these processor control instructions may comprise any set of instructions to be executed directly (such as machine code) or indirectly (such as scripts) by the processor(s). In that regard, the terms "instructions," "steps", "algorithm," "methods" and "programs" may be used interchangeably herein. The instructions may be stored in object code for direct processing by a processor, or in any other computer language including scripts or collections of independent source code modules that are interpreted on demand or compiled in advance.

For example, as illustrated in FIG. 4, the memory 416 can include processor control instructions 420 for automatically segmenting videos. These control instructions may also control automatically selecting of search frames from videos.

Additionally, the memory may include GIS data 418 such as the images from an image-based GIS. The memory may also include video data 421 for the automatic processes described herein. Moreover, the memory may include processor control instructions for comparing the image information and generating best match associations as previously discussed. Optionally, these control instructions may include the processing algorithms to derive the information to be compared from the pixel information of the search frames and candidate images. Moreover, the memory may include the stored associations 424 generated by the comparison process.

Figure 5:
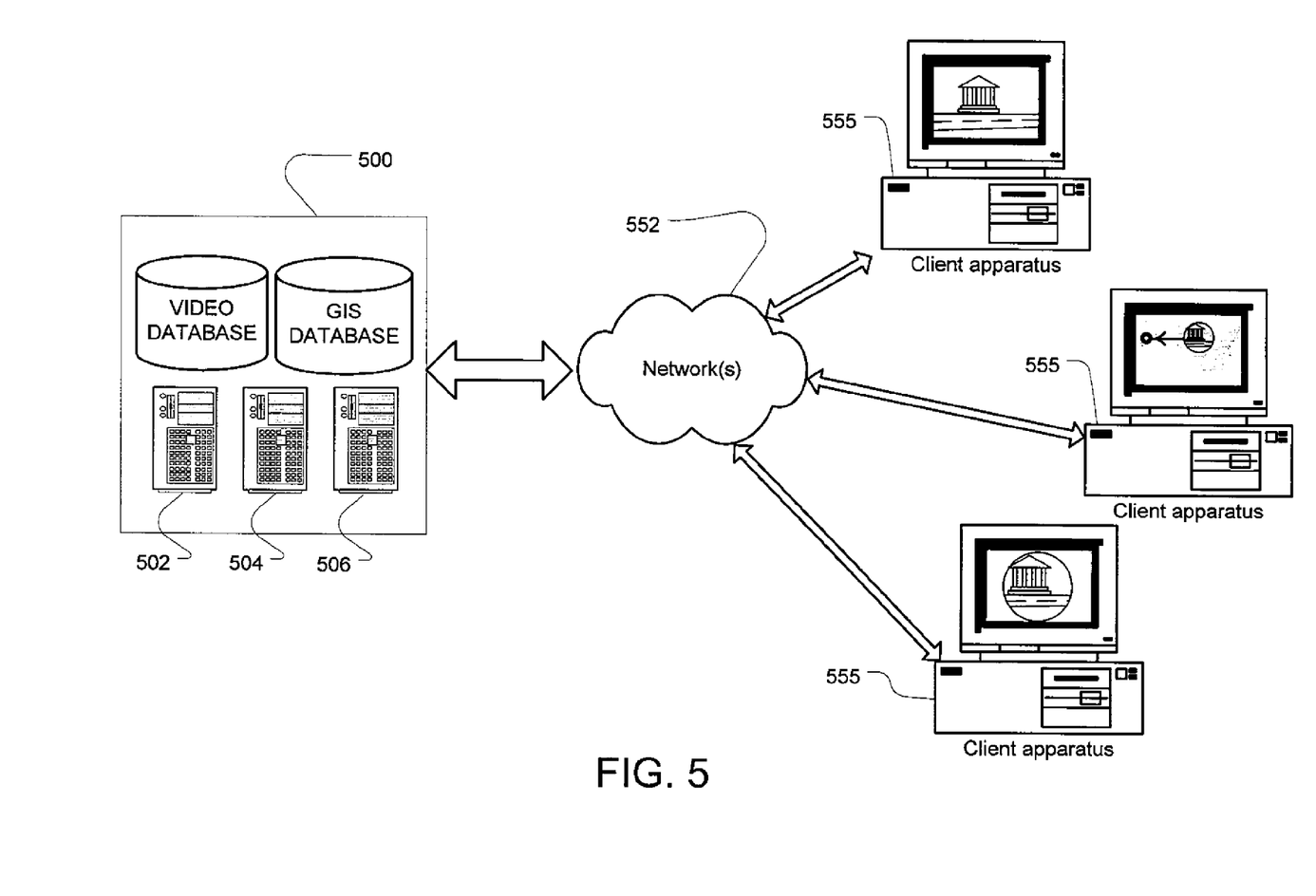
FIG. 5 is a network diagram of an embodiment of a system for accessing associations between videos and images of image-based geographic information systems of the present technology.

As further illustrated in the system diagram of FIG. 5, a computer apparatus 502, 504, 506, such as the example of FIG. 4, may be implemented for a network GIS system 500 for providing access to the videos using a user interface of a GIS. The data of the GIS and videos may be accessed by a user via a client apparatus across the network 552, such as with a network browser application and video player of a client apparatus 555. In such an example, the client apparatus may be a general or specific purpose computer such as a laptop computer, desktop computer, hand-held computer or other programmable processing device, etc. that may be running a browser application and/or a video player application. Typically, such client devices will include processors, memory and input/output devices such as display screens, mouse, keyboard, network communications components etc.

Figure 6:
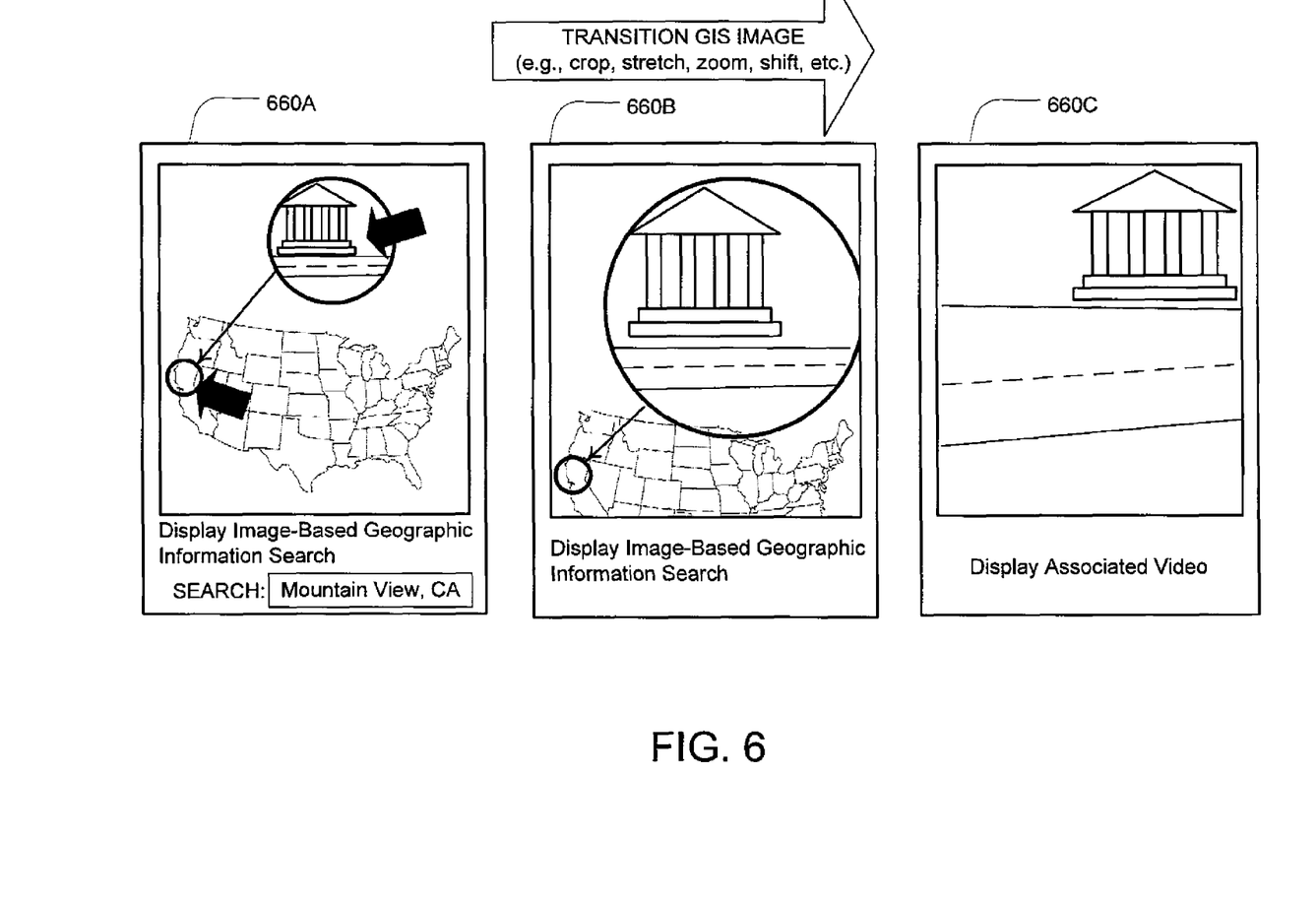
FIG. 6 illustrates an example user interface for transitioning a display between images of an image-based geographic information system and a linked video that may be implemented with the present technology.

With such a system, a user may gain access to geographically related videos via an image-based GIS that is maintained by the GIS system 500. For example, access to video data is illustrated with the views 660A, 660B and 660C of FIG. 6. At view 660A, a user of a client apparatus has entered a geographic text search (e.g., "Mountainview, Calif."). Based on the entered search information a request is sent to the server of the GIS system 500. In response, the client apparatus receives information to display map details associated with the text search. By then clicking or selecting a particular location on the map with an input device of the client computer, a request may be sent to a server of the GIS system 200 to request an associated image of the GIS. That image is sent from the server and then displayed on the display of the client apparatus. If the user then clicks on the image or other icon indicative of the availability of an associated video, a request may be sent to a server of the GIS system. In response to this request a video may be streamed or downloaded to the display on the client apparatus as shown in view 660C based on a stored association determined in the comparison process previously described. Optionally, prior to this display of the video in view 660C, the client apparatus may then present one or more transition images on the client apparatus that are provided by the server as illustrated in view 660B. These transition images can be based on the transition data of the GIS as previously described.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order or count but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

The invention claimed is:

1. A method for automated processing of image data, comprising:
   identifying, using one or more processors, a representative image of a segment of a video comprising a plurality of image frames depicting a location, wherein beginning and ending frames of the segment are determined by:
      detecting one or more geometric patterns in a given image frame of the video, and
      determining whether the detected one or more geometric patterns are in a neighboring frame to the given frame;
   selecting one or more images from an image-based data structure based on the representative image, including identifying where positioning information of the one or more images overlaps with positioning information associated with the representative image; and
   generating, using the one or more processors, an association between the representative image and at least one image of the selected one or more images such that the video is provided in response to an image request, the association comprising a link between the at least one image of the selected one or more images and the segment of the video, the link being accessible to the image-based data structure,
   wherein accessing of the link initiates playing of the segment of video data that includes the detected one or more geometric patterns without playing the entire video.

2. The method of claim 1, wherein selecting the one or more images from the image-based data structure includes comparing one or more of histogram data, color distribution data, texture distribution data, and geometric feature data from the representative image with a given image of the image-based data structure.

3. The method of claim 1, further comprising updating a display image of the image-based data structure to correspond with a frame of the video that includes the detected one or more geometric patterns.

4. The method of claim 3, wherein the updating of the display image comprises one or more of stretching, cropping, zooming, rotating, and shrinking at least a frame of the video.

5. The method of claim 1, wherein the selected one or more images includes a reduced candidate image set of the image-based data structure, the reduced candidate image set selected by comparing first positioning information associated with the video with second positioning information associated with certain ones of the one or more images of the image-based data structure.

6. A non-transitory computer-readable storage medium comprising instructions that, when executed by a processor, cause the processor to perform a method, the method comprising:
   identifying, using one or more processors, a representative image of a segment of a video comprising a plurality of image frames depicting a location, wherein beginning and ending frames of the segment are determined by:
      detecting one or more geometric patterns in a given image frame of the video, and
      determining whether the detected one or more geometric patterns are in a neighboring frame to the given frame;
   selecting one or more images from an image-based data structure based on the representative image, including indentifying where positioning information of the one or more images overlaps with positioning information associated with the representative image; and generating, using the one or more processors, an association between the representative image and at least one image of the selected one or more images such that the video is provided in response to an image request, the association comprising a link between the at least one image of the selected one or more images and the segment of the video, the link being accessible to the image-based data structure, wherein accessing of the link initiates playing of the segment of video data that includes the detected one or more geometric patterns without playing the entire video.

7. The non-transitory computer-readable medium of claim 6, wherein selecting the one or more images from the image-based data structure includes comparing one or more of histogram data, color distribution data, texture distribution data, and geometric feature data from the representative image with a given image of the image-based data structure.

8. The non-transitory computer-readable medium of claim 6, further comprising updating a display image of the image-based data structure to correspond with a frame of the video that includes the detected one or more geometric patterns.

9. The non-transitory computer-readable medium of claim 8, wherein the updating of the display image comprises one or more of stretching, cropping, zooming, rotating, and shrinking at least a frame of the video.

10. A system for automated processing of image data, comprising:
   a memory; and
   one or more processors coupled to the memory, the one or more processors being configured to:
   identify a representative image of a segment of a video comprising a plurality of image frames depicting a location, wherein beginning and ending frames of the segment are determined by the one or more processors being configured to:
      detect one or more geometric patterns in a given image frame of the video, and
      determine whether the detected one or more geometric patterns are in a neighboring frame to the given frame;
   select one or more images from an image-based data structure based on the representative image, including indentifying where positioning information of the one or more images overlaps with positioning information associated with the representative image; and
   generate an association between the representative image and at least one image of the selected one or more images such that the video is provided in response to an image request, the association comprising a link between the at least one image of the selected one or more images and the segment of the video, the link being accessible to the image-based data structure,
   wherein accessing of the link initiates the one or more processors to play the segment of video data that includes the detected one or more geometric patterns without playing the entire video.

11. The system of claim 10, wherein selecting the one or more images from the image-based data structure includes comparing one or more of histogram data, color distribution data, texture distribution data, and geometric feature data from the representative image with a given image of the image-based data structure.

12. The system of claim 10, wherein the one or more processors are further configured to update a display image of the image-based data structure to correspond with a frame of the video that includes the detected one or more geometric patterns.

13. The system of claim 12, wherein the updating of the display image comprises one or more of stretching, cropping, zooming, rotating, and shrinking at least a frame of the video.

14. The system of claim 10, wherein the selected one or more images includes a reduced candidate image set of the image-based data structure, the reduced candidate image set selected by comparing first positioning information associated with the video with second positioning information associated with certain ones of the one or more images of the image-based data structure.

\* \* \* \* \*

UNITED STATES PATENT AND TRADEMARK OFFICE
CERTIFICATE OF CORRECTION

| | | |
|---|---|---|
| PATENT NO. | : 8,847,951 B1 | Page 1 of 1 |
| APPLICATION NO. | : 14/055242 | |
| DATED | : September 30, 2014 | |
| INVENTOR(S) | : Dragomir Anguelov et al. | |

It is certified that error appears in the above-identified patent and that said Letters Patent is hereby corrected as shown below:

On the title page item 72 Inventors: after "Haifa," delete "IL (US)" and insert therefor --Israel--.

Signed and Sealed this
Fifth Day of January, 2016

Michelle K. Lee
*Director of the United States Patent and Trademark Office*